F. D. BAKER.
CURRY-COMB.
No. 172,948. Patented Feb. 1, 1876.
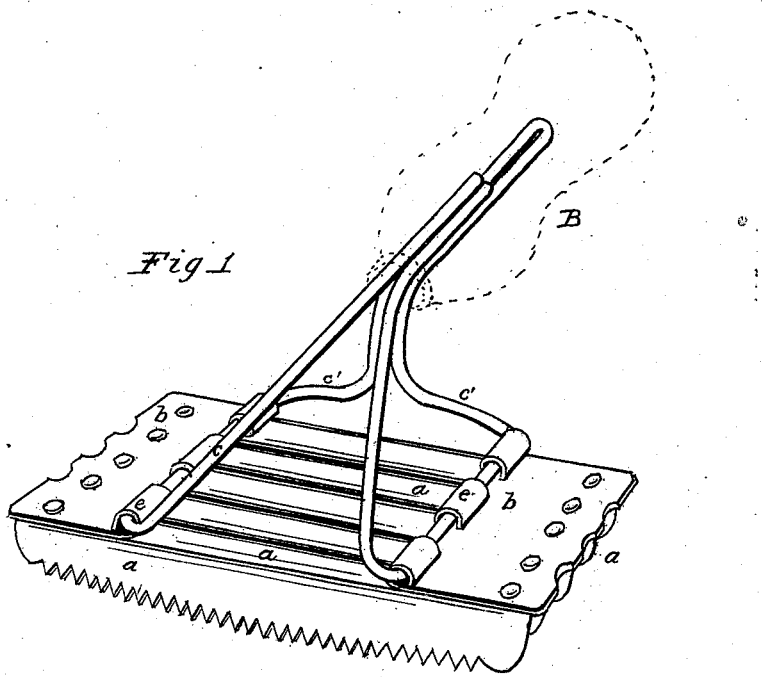
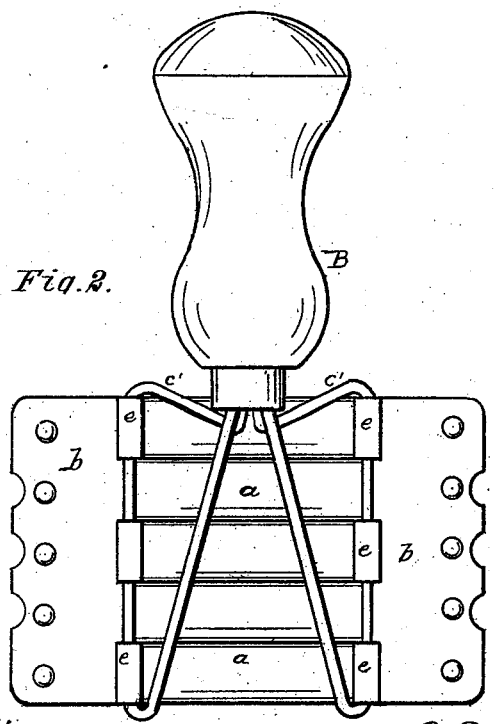
Witnesses:
Frank M. Green.
Courtney A. Cooper.
F. D. Baker
By his atty.
Charles E. Foster.

UNITED STATES PATENT OFFICE.

FREDERICK D. BAKER, OF NEW YORK, N. Y., ASSIGNOR TO THE LAWRENCE CURRY-COMB COMPANY, OF SAME PLACE.

IMPROVEMENT IN CURRY-COMBS.

Specification forming part of Letters Patent No. 172,948, dated February 1, 1876; application filed November 6, 1875.

*To all whom it may concern:*

Be it known that I, FREDERICK D. BAKER, of the city, county, and State of New York, have invented certain Improvements in Curry-Combs, of which the following is the specification:

My invention relates to an improvement in that class of curry-combs in which the handle is connected to the comb through the medium of rods or bars extending over the back of the comb and constituting a supplementary handle; and the object of my invention is to render the comb compact and durable, enable it to be readily handled and cleansed, and facilitate its manufacture.

In the accompanying drawing, Figure 1 is a perspective view of a curry-comb constructed in accordance with my invention, and Fig. 2 a plan view.

The comb A consists of a series of toothed bars, *a a*, which may be constructed, arranged, and connected together in any suitable manner, but in the present instance are shown as secured to two plates, *b b*, riveted to the backs of the bars at their opposite ends.

The handle B is connected to the comb by rods or bars *c c c' c'*, the first two of which diverge from the handle toward the front, and the others toward the rear, of the comb, to the back of which all are secured at such a distance from the sides as to leave them unobstructed.

The rods extending above the back of the comb, and connecting the latter and the handle, form a frame which constitutes a supplementary handle, as described in the Letters Patent granted to Cyrus W. Saladee, May 7, 1865.

The frame may consist of separate rods or bars, or it may be formed of a continuous rod or wire, bent as shown in the drawing, and, although various modes may be adopted of securing the frame or bars to lugs at the back of the comb, I prefer to bend the inner edges of the plate *b b*, or projections thereof, to form tubular lugs, through which portions of the wire frame extend horizontally across the back of the comb. I, however, make no claim to the combination of a comb, a handle; and intermediate frame or rods connected to the handle and to the back of the comb.

The broad plates *b* not only strengthen the comb, but also, as before described, afford a means of connecting the rods to the comb without the use of vertical studs, which are in the way, and abrade the hand of the operator, while the wires passing through the lugs *e* increase the strength of the comb and the rigidity of the frame.

I claim as my invention—

The combination of the toothed bars *a*, plates *b b* secured to the backs of said bars, handle B, and rods connected to said handle and extending through a series of lugs arranged at or near the inner edges of said plates, as set forth.

In testimony whereof, I have signed my name to this specification in the presence of two subscribing witnesses.

FREDERICK D. BAKER.

Witnesses:
C. E. L. HOLMES,
H. A. LOOMIS.